US012694382B2

(12) United States Patent
Pabby et al.

(10) Patent No.: US 12,694,382 B2
(45) Date of Patent: Jul. 28, 2026

(54) SYSTEM AND METHOD FOR HIGH-SPEED PAYMENT MATCHING ON A PROCESSING CLUSTER

(71) Applicant: RIA Advisory LLC, Coral Gables, FL (US)

(72) Inventors: Saket Pabby, Coral Gables, FL (US); Supriya Mukhapadhyay, Naperville, IL (US); Unnikrishnan Gopinath, Kolllam (IN)

(73) Assignee: RIA Advisory LLC, Coral Gables, FL (US)

( * ) Notice: Subject to any disclaimer, the term of this patent is extended or adjusted under 35 U.S.C. 154(b) by 984 days.

(21) Appl. No.: 17/246,350

(22) Filed: Apr. 30, 2021

(65) Prior Publication Data

US 2022/0351166 A1     Nov. 3, 2022

(51) Int. Cl.
| | |
|---|---|
| *G06Q 40/08* | (2012.01) |
| *G06F 16/23* | (2019.01) |
| *G06F 16/2457* | (2019.01) |
| *G06F 16/248* | (2019.01) |
| *G06Q 20/14* | (2012.01) |
| *G06Q 30/04* | (2012.01) |
| *G06Q 40/00* | (2023.01) |
| *G06Q 40/12* | (2023.01) |
| *G06F 16/22* | (2019.01) |
| *G06Q 20/40* | (2012.01) |

(52) U.S. Cl.
CPC ......... *G06Q 20/14* (2013.01); *G06F 16/2365* (2019.01); *G06Q 30/04* (2013.01); *G06Q*
*40/12* (2013.12); *G06F 16/22* (2019.01); *G06Q 20/407* (2013.01)

(58) Field of Classification Search
CPC ........ G06Q 20/14; G06Q 40/12; G06Q 30/04; G06F 16/2365; G06F 16/22
See application file for complete search history.

(56) References Cited

U.S. PATENT DOCUMENTS

| | | | |
|---|---|---|---|
| 10,504,187 B1 * | 12/2019 | Rajan ..................... | G06Q 40/08 |
| 11,080,668 B2 * | 8/2021 | Ceribelli ............ | G06Q 20/1085 |
| 2003/0233321 A1 * | 12/2003 | Scolini ................... | G06Q 20/04 705/40 |

(Continued)

*Primary Examiner* — Talia F Crawley
(74) *Attorney, Agent, or Firm* — Terrile, Cannatti & Chambers, LLP; Emmanuel A. Rivera

(57) ABSTRACT

A method and system for high-speed, high-volume payment processing for transaction environments having a large number of customers is provided. Embodiments reduce the time required to apply payments against large invoices having, for example, hundreds of thousands of invoice lines through the use of a parallel processing methodology coupled with redistribution of tasks among the various processors in order to optimize available processing power. Embodiments thereby provide a scalable payment processing system that reduces the time required to match payment entries against high volume invoices. Embodiments provide a solution to an existing issue that increasing a number of threads executed (e.g., by increasing CPU cores) for a payment-matching operation against a large invoice does not necessarily reduce processing time needed to complete the operation due to a whole payment being processed as one unit of work within the context of a single thread.

19 Claims, 16 Drawing Sheets

100

(56)            References Cited

U.S. PATENT DOCUMENTS

| | | | |
|---|---|---|---|
| 2005/0010524 A1* | 1/2005 | Gutbrod ............... | G06Q 20/102 |
| | | | 705/40 |
| 2006/0206425 A1* | 9/2006 | Sharma ................. | G06Q 20/02 |
| | | | 705/40 |
| 2010/0281166 A1* | 11/2010 | Buyya ................... | G06F 9/5072 |
| | | | 709/226 |
| 2013/0041795 A1* | 2/2013 | Baratz ................ | G06Q 10/0832 |
| | | | 705/34 |
| 2013/0226798 A1* | 8/2013 | Orttung ............... | G06Q 20/027 |
| | | | 705/44 |
| 2020/0098051 A1* | 3/2020 | Rajan ..................... | G06Q 40/08 |
| 2020/0279308 A1 | 9/2020 | Pabby et al. | |
| 2022/0188805 A1* | 6/2022 | Debellis ............... | G06Q 20/065 |

\* cited by examiner

400

| PAYMENT ID | CUSTOMER ID | PAY AMOUNT($) | INVOICE ID | PAYMENT MODE | PAYMENT DATE | PAYMENT STATUS |
|---|---|---|---|---|---|---|
| P1 | C1 | 50 | I1 | CHECK | 1-APR-21 | PENDING |
| P2 | C1 | 50 | I1 | CASH | 1-APR-21 | PENDING |
| P3 | C2 | 50 | I2 | CHECK | 1-APR-21 | PENDING |
| P4 | C3 | 60 | I3 | CHECK | 1-APR-21 | PENDING |

| PAYMENT ID | CUSTOMER ID | PAY AMOUNT($) | INVOICE ID | PAYMENT MODE | PAYMENT DATE | PAYMENT STATUS | PRIORITY |
|---|---|---|---|---|---|---|---|
| P1 | C1 | 50 | I1 | CHECK | 1-APR-21 | PENDING | 1 |
| P2 | C1 | 50 | I1 | CASH | 1-APR-21 | PENDING | 2 |
| P3 | C2 | 50 | I2 | CHECK | 1-APR-21 | PENDING | 1 |
| P4 | C3 | 60 | I3 | CHECK | 1-APR-21 | PENDING | 1 |

| PARTITION 1 | | | | | | | 810 |
|---|---|---|---|---|---|---|---|
| PAYMENT ID | CUSTOMER ID | PAY AMOUNT($) | INVOICE ID | PAYMENT MODE | PAYMENT DATE | PAYMENT STATUS | PRIORITY | ACTION |
| P1 | C1 | 50 | I1 | CHECK | 1-APR-21 | VALID | 1 | CREATE |

| PARTITION 2 | | | | | | | 820 |
|---|---|---|---|---|---|---|---|
| PAYMENT ID | CUSTOMER ID | PAY AMOUNT($) | INVOICE ID | PAYMENT MODE | PAYMENT DATE | PAYMENT STATUS | PRIORITY | ACTION |
| P3 | C2 | 50 | I2 | CHECK | 1-APR-21 | VALID | 1 | CREATE |

| PARTITION 3 | | | | | | | 830 |
|---|---|---|---|---|---|---|---|
| PAYMENT ID | CUSTOMER ID | PAY AMOUNT($) | INVOICE ID | PAYMENT MODE | PAYMENT DATE | PAYMENT STATUS | PRIORITY | ACTION |
| P4 | C3 | 60 | I3 | CHECK | 1-APR-21 | VALID | 1 | CREATE |

FIG. 8

PARTITION 1 910

| PAYMENT ID | CUSTOMER ID | PAY AMOUNT($) | INVOICE ID | PAYMENT MODE | PAYMENT DATE | STATUS | PRIORITY | INVOICE LINE ID | PAY LINE AMOUNT($) |
|---|---|---|---|---|---|---|---|---|---|
| P1 | C1 | 50 | I1 | CHECK | 1-APR-21 | NEW | 1 | IL1 | 10 |
| P1 | C1 | 50 | I1 | CHECK | 1-APR-21 | NEW | 1 | IL2 | 10 |
| P1 | C1 | 50 | I1 | CHECK | 1-APR-21 | NEW | 1 | IL3 | 10 |
| P1 | C1 | 50 | I1 | CHECK | 1-APR-21 | NEW | 1 | IL4 | 10 |
| P1 | C1 | 50 | I1 | CHECK | 1-APR-21 | NEW | 1 | IL5 | 10 |

912 914

PARTITION 2 920

| PAYMENT ID | CUSTOMER ID | PAY AMOUNT($) | INVOICE ID | PAYMENT MODE | PAYMENT DATE | STATUS | PRIORITY | INVOICE LINE ID | PAY LINE AMOUNT($) |
|---|---|---|---|---|---|---|---|---|---|
| P3 | C2 | 50 | I2 | CHECK | 1-APR-21 | NEW | 1 | IL11 | 10 |
| P3 | C2 | 50 | I2 | CHECK | 1-APR-21 | NEW | 1 | IL12 | 10 |
| P3 | C2 | 50 | I2 | CHECK | 1-APR-21 | NEW | 1 | IL13 | 10 |
| P3 | C2 | 50 | I2 | CHECK | 1-APR-21 | NEW | 1 | IL14 | 10 |
| P3 | C2 | 50 | I2 | CHECK | 1-APR-21 | NEW | 1 | IL15 | 10 |

922 924

PARTITION 3 930

| PAYMENT ID | CUSTOMER ID | PAY AMOUNT($) | INVOICE ID | PAYMENT MODE | PAYMENT DATE | STATUS | PRIORITY | INVOICE LINE ID | PAY LINE AMOUNT($) |
|---|---|---|---|---|---|---|---|---|---|
| P4 | C3 | 60 | I3 | CHECK | 1-APR-21 | NEW | 1 | IL16 | 10 |
| P4 | C3 | 60 | I3 | CHECK | 1-APR-21 | NEW | 1 | IL17 | 10 |
| P4 | C3 | 60 | I3 | CHECK | 1-APR-21 | NEW | 1 | IL18 | 10 |
| P4 | C3 | 60 | I3 | CHECK | 1-APR-21 | NEW | 1 | IL19 | 10 |
| P4 | C3 | 60 | I3 | CHECK | 1-APR-21 | NEW | 1 | | 20 |

PARTITION 1  1010

1012

| PAY LINE ID | PAYMENT ID | CUSTOMER ID | PAY AMOUNT($) | INVOICE ID | PAYMENT MODE | PAYMENT DATE | STATUS | PRIORITY | INVOICE LINE ID | PAY LINE AMOUNT($) |
|---|---|---|---|---|---|---|---|---|---|---|
| S1-001-01 | P1 | C1 | 50 | I1 | CHECK | 1-APR-21 | NEW | 1 | IL1 | 10 |
| S1-001-34 | P1 | C1 | 50 | I1 | CHECK | 1-APR-21 | NEW | 1 | IL2 | 10 |
| S3-001-11 | P3 | C2 | 50 | I2 | CHECK | 1-APR-21 | NEW | 1 | IL11 | 10 |

PARTITION 2  1020

1022

| PAY LINE ID | PAYMENT ID | CUSTOMER ID | PAY AMOUNT($) | INVOICE ID | PAYMENT MODE | PAYMENT DATE | STATUS | PRIORITY | INVOICE LINE ID | PAY LINE AMOUNT($) |
|---|---|---|---|---|---|---|---|---|---|---|
| S1-002-56 | P1 | C1 | 50 | I1 | CHECK | 1-APR-21 | NEW | 1 | IL3 | 10 |
| S1-002-30 | P1 | C1 | 50 | I1 | CHECK | 1-APR-21 | NEW | 1 | IL4 | 10 |
| S4-002-81 | P3 | C2 | 50 | I2 | CHECK | 1-APR-21 | NEW | 1 | IL13 | 10 |

PARTITION 3  1030

1032

| PAY LINE ID | PAYMENT ID | CUSTOMER ID | PAY AMOUNT($) | INVOICE ID | PAYMENT MODE | PAYMENT DATE | STATUS | PRIORITY | INVOICE LINE ID | PAY LINE AMOUNT($) |
|---|---|---|---|---|---|---|---|---|---|---|
| S2-003-32 | P1 | C1 | 50 | I1 | CHECK | 1-APR-21 | NEW | 1 | IL5 | 10 |
| S4-003-19 | P3 | C2 | 50 | I2 | CHECK | 1-APR-21 | NEW | 1 | IL15 | 10 |
| S5-003-17 | P4 | C3 | 60 | I3 | CHECK | 1-APR-21 | NEW | 1 | IL16 | 10 |

TO FIG. 10B

FROM FIG. 10A

PARTITION 4  1040

1042      1044

| PAY LINE ID | PAYMENT ID | CUSTOMER ID | PAY AMOUNT($) | INVOICE ID | PAYMENT MODE | PAYMENT DATE | STATUS | PRIORITY | INVOICE LINE ID | PAY LINE AMOUNT($) |
|---|---|---|---|---|---|---|---|---|---|---|
| S5-004-21 | P4 | C3 | 60 | I3 | CHECK | 1-APR-21 | NEW | 1 | IL18 | 10 |
| S6-004-15 | P4 | C3 | 60 | I3 | CHECK | 1-APR-21 | NEW | 1 | IL19 | 10 |
| C3-004-68 | P4 | C3 | 60 | I3 | CHECK | 1-APR-21 | NEW | 1 |  | 20 |

PARTITION 5  1050

1052

| PAY LINE ID | PAYMENT ID | CUSTOMER ID | PAY AMOUNT($) | INVOICE ID | PAYMENT MODE | PAYMENT DATE | STATUS | PRIORITY | INVOICE LINE ID | PAY LINE AMOUNT($) |
|---|---|---|---|---|---|---|---|---|---|---|
| S4-005-52 | P3 | C2 | 50 | I2 | CHECK | 1-APR-21 | NEW | 1 | IL14 | 10 |
| S3-005-07 | P3 | C2 | 50 | I2 | CHECK | 1-APR-21 | NEW | 1 | IL12 | 10 |
| S5-005-17 | P4 | C3 | 60 | I3 | CHECK | 1-APR-21 | NEW | 1 | IL17 | 10 |

PARTITION 1 1110

| FT ID | PAY LINE ID | PAYMENT ID | CUSTOMER ID | PAY AMOUNT($) | INVOICE ID | PAYMENT MODE | PAYMENT DATE | STATUS | PRIORITY | INVOICE LINE ID | PAY LINE AMOUNT($) |
|---|---|---|---|---|---|---|---|---|---|---|---|
| S1-001-56 | S1-001-01 | P1 | C1 | 50 | I1 | CHECK | 1-APR-21 | NEW | 1 | IL1 | 10 |
| S1-001-76 | S1-001-34 | P1 | C1 | 50 | I1 | CHECK | 1-APR-21 | NEW | 1 | IL2 | 10 |
| S3-001-11 | S3-001-11 | P3 | C2 | 50 | I2 | CHECK | 1-APR-21 | NEW | 1 | IL11 | 10 |

1112   1114   1116

PARTITION 2 1120

| FT ID | PAY LINE ID | PAYMENT ID | CUSTOMER ID | PAY AMOUNT($) | INVOICE ID | PAYMENT MODE | PAYMENT DATE | STATUS | PRIORITY | INVOICE LINE ID | PAY LINE AMOUNT($) |
|---|---|---|---|---|---|---|---|---|---|---|---|
| S1-002-90 | S1-002-56 | P1 | C1 | 50 | I1 | CHECK | 1-APR-21 | NEW | 1 | IL3 | 10 |
| S2-002-47 | S1-002-30 | P1 | C1 | 50 | I1 | CHECK | 1-APR-21 | NEW | 1 | IL4 | 10 |
| S4-002-72 | S1-002-81 | P3 | C2 | 50 | I2 | CHECK | 1-APR-21 | NEW | 1 | IL13 | 10 |

1122   1126

PARTITION 3 1130

| FT ID | PAY LINE ID | PAYMENT ID | CUSTOMER ID | PAY AMOUNT($) | INVOICE ID | PAYMENT MODE | PAYMENT DATE | STATUS | PRIORITY | INVOICE LINE ID | PAY LINE AMOUNT($) |
|---|---|---|---|---|---|---|---|---|---|---|---|
| S2-003-39 | S2-003-32 | P1 | C1 | 50 | I1 | CHECK | 1-APR-21 | NEW | 1 | IL5 | 10 |
| S4-003-14 | S4-003-19 | P3 | C2 | 50 | I2 | CHECK | 1-APR-21 | NEW | 1 | IL15 | 10 |
| S5-003-94 | S5-003-17 | P4 | C3 | 60 | I3 | CHECK | 1-APR-21 | NEW | 1 | IL16 | 10 |

FROM FIG. 11A

PARTITION 4   1140

1142

| FT ID | PAY LINE ID | PAYMENT ID | CUSTOMER ID | PAY AMOUNT($) | INVOICE ID | PAYMENT MODE | PAYMENT DATE | STATUS | PRIORITY | INVOICE LINE ID | PAY LINE AMOUNT($) |
|---|---|---|---|---|---|---|---|---|---|---|---|
| S5-004-11 | S5-004-21 | P4 | C3 | 60 | I3 | CHECK | 1-APR-21 | NEW | 1 | IL18 | 10 |
| S6-004-38 | S6-004-15 | P4 | C3 | 60 | I3 | CHECK | 1-APR-21 | NEW | 1 | IL19 | 10 |
| C3-004-51 | C3-004-68 | P4 | C3 | 60 | I3 | CHECK | 1-APR-21 | NEW | 1 | | 20 |

1146

PARTITION 5   1150

1152

| FT ID | PAY LINE ID | PAYMENT ID | CUSTOMER ID | PAY AMOUNT($) | INVOICE ID | PAYMENT MODE | PAYMENT DATE | STATUS | PRIORITY | INVOICE LINE ID | PAY LINE AMOUNT($) |
|---|---|---|---|---|---|---|---|---|---|---|---|
| S4-005-45 | S4-005-52 | P3 | C2 | 50 | I2 | CHECK | 1-APR-21 | NEW | 1 | IL14 | 10 |
| S3-005-39 | S3-005-07 | P3 | C2 | 50 | I2 | CHECK | 1-APR-21 | NEW | 1 | IL12 | 10 |
| S5-005-88 | S5-005-17 | P4 | C3 | 60 | I3 | CHECK | 1-APR-21 | NEW | 1 | IL17 | 10 |

Figure 12A:
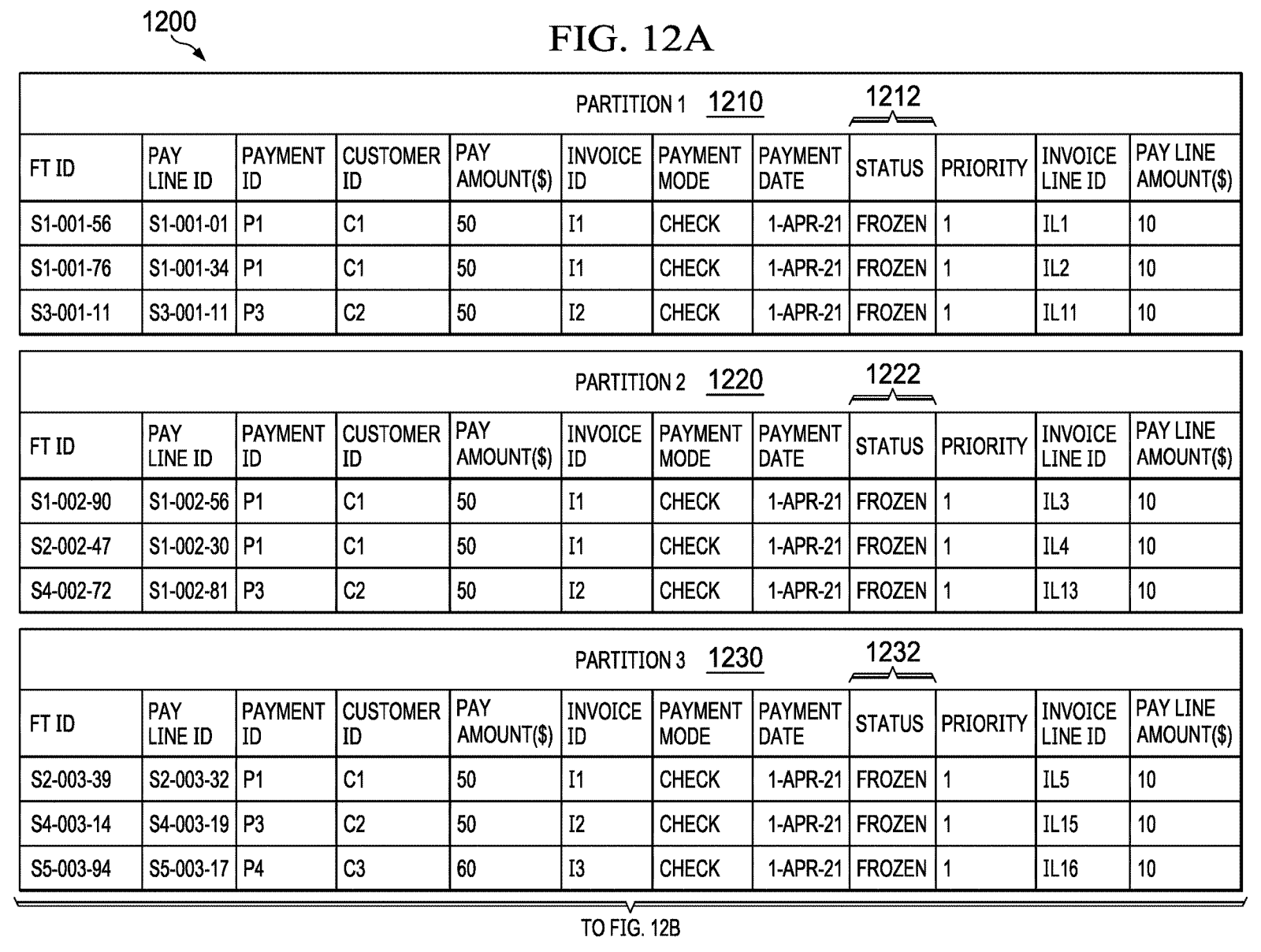

PARTITION 1 1210 / 1212

| FT ID | PAY LINE ID | PAYMENT ID | CUSTOMER ID | PAY AMOUNT($) | INVOICE ID | PAYMENT MODE | PAYMENT DATE | STATUS | PRIORITY | INVOICE LINE ID | PAY LINE AMOUNT($) |
|---|---|---|---|---|---|---|---|---|---|---|---|
| S1-001-56 | S1-001-01 | P1 | C1 | 50 | I1 | CHECK | 1-APR-21 | FROZEN | 1 | IL1 | 10 |
| S1-001-76 | S1-001-34 | P1 | C1 | 50 | I1 | CHECK | 1-APR-21 | FROZEN | 1 | IL2 | 10 |
| S3-001-11 | S3-001-11 | P3 | C2 | 50 | I2 | CHECK | 1-APR-21 | FROZEN | 1 | IL11 | 10 |

PARTITION 2 1220 / 1222

| FT ID | PAY LINE ID | PAYMENT ID | CUSTOMER ID | PAY AMOUNT($) | INVOICE ID | PAYMENT MODE | PAYMENT DATE | STATUS | PRIORITY | INVOICE LINE ID | PAY LINE AMOUNT($) |
|---|---|---|---|---|---|---|---|---|---|---|---|
| S1-002-90 | S1-002-56 | P1 | C1 | 50 | I1 | CHECK | 1-APR-21 | FROZEN | 1 | IL3 | 10 |
| S2-002-47 | S1-002-30 | P1 | C1 | 50 | I1 | CHECK | 1-APR-21 | FROZEN | 1 | IL4 | 10 |
| S4-002-72 | S1-002-81 | P3 | C2 | 50 | I2 | CHECK | 1-APR-21 | FROZEN | 1 | IL13 | 10 |

PARTITION 3 1230 / 1232

| FT ID | PAY LINE ID | PAYMENT ID | CUSTOMER ID | PAY AMOUNT($) | INVOICE ID | PAYMENT MODE | PAYMENT DATE | STATUS | PRIORITY | INVOICE LINE ID | PAY LINE AMOUNT($) |
|---|---|---|---|---|---|---|---|---|---|---|---|
| S2-003-39 | S2-003-32 | P1 | C1 | 50 | I1 | CHECK | 1-APR-21 | FROZEN | 1 | IL5 | 10 |
| S4-003-14 | S4-003-19 | P3 | C2 | 50 | I2 | CHECK | 1-APR-21 | FROZEN | 1 | IL15 | 10 |
| S5-003-94 | S5-003-17 | P4 | C3 | 60 | I3 | CHECK | 1-APR-21 | FROZEN | 1 | IL16 | 10 |

TO FIG. 12B

FROM FIG. 12A

PARTITION 4　1240

1242

| FT ID | PAY LINE ID | PAYMENT ID | CUSTOMER ID | PAY AMOUNT($) | INVOICE ID | PAYMENT MODE | PAYMENT DATE | STATUS | PRIORITY | INVOICE LINE ID | PAY LINE AMOUNT($) |
|---|---|---|---|---|---|---|---|---|---|---|---|
| S5-004-11 | S5-004-21 | P4 | C3 | 60 | I3 | CHECK | 1-APR-21 | FROZEN | 1 | IL18 | 10 |
| S6-004-38 | S6-004-15 | P4 | C3 | 60 | I3 | CHECK | 1-APR-21 | FROZEN | 1 | IL19 | 10 |
| C3-004-51 | C3-004-68 | P4 | C3 | 60 | I3 | CHECK | 1-APR-21 | FROZEN | 1 | | 20 |

PARTITION 5　1250

1252

| FT ID | PAY LINE ID | PAYMENT ID | CUSTOMER ID | PAY AMOUNT($) | INVOICE ID | PAYMENT MODE | PAYMENT DATE | STATUS | PRIORITY | INVOICE LINE ID | PAY LINE AMOUNT($) |
|---|---|---|---|---|---|---|---|---|---|---|---|
| S4-005-45 | S4-005-52 | P3 | C2 | 50 | I2 | CHECK | 1-APR-21 | FROZEN | 1 | IL14 | 10 |
| S3-005-39 | S3-005-07 | P3 | C2 | 50 | I2 | CHECK | 1-APR-21 | FROZEN | 1 | IL12 | 10 |
| S5-005-88 | S5-005-17 | P4 | C3 | 60 | I3 | CHECK | 1-APR-21 | FROZEN | 1 | IL17 | 10 |

PARTITION 1 __1310__

| PAYMENT ID | CUSTOMER ID | PAY AMOUNT($) | INVOICE ID | PAYMENT MODE | PAYMENT DATE | PAYMENT STATUS | PRIORITY | ACTION |
|---|---|---|---|---|---|---|---|---|
| P1 | C1 | 50 | I1 | CHECK | 1-APR-21 | FROZEN | 1 | CREATE |

PARTITION 2 __1320__

| PAYMENT ID | CUSTOMER ID | PAY AMOUNT($) | INVOICE ID | PAYMENT MODE | PAYMENT DATE | PAYMENT STATUS | PRIORITY | ACTION |
|---|---|---|---|---|---|---|---|---|
| P3 | C2 | 50 | I2 | CHECK | 1-APR-21 | ERROR | 1 | CREATE |

PARTITION 3 __1330__

| PAYMENT ID | CUSTOMER ID | PAY AMOUNT($) | INVOICE ID | PAYMENT MODE | PAYMENT DATE | PAYMENT STATUS | PRIORITY | ACTION |
|---|---|---|---|---|---|---|---|---|
| P4 | C3 | 60 | I3 | CHECK | 1-APR-21 | FROZEN | 1 | CREATE |

FIG. 13

SYSTEM AND METHOD FOR HIGH-SPEED PAYMENT MATCHING ON A PROCESSING CLUSTER

BACKGROUND

Field

This disclosure relates generally to the field of information handling systems, and more specifically, to hardware and software for high-speed payment creation and matching on a processing cluster.

Related Art

Various institutions, such as large utilities, health care payers, and financial services, process high volumes of transactions and convert them into billable items for invoicing their customers for usage of products and services. In case of big customers, such as employer groups for health care payers, generated invoices often contain large numbers of invoice lines (e.g., several hundred thousand billable items). When customers make a payment against such invoices, the payment needs to be matched with and applied against invoice line items for accounting purposes. Existing payment processing solutions can take many hours to distribute and match payments against such large numbers of invoice line items. When there are many large customers receiving invoices with large numbers of line items, existing payment posting and distribution solutions are unable to effectively and efficiently address the need to process such high-volume payments in a timely manner.

An example of a typical existing payment processing solution is the Oracle® Revenue Management and Billing (ORMB) system. When a payment is manually entered or uploaded to an ORMB system, the system validates the payment, identifies outstanding invoices and the line items of the customer that made the payment, and then applies or distributes the paid amount to the invoice lines and creates payment lines. If the payment is correctly distributed, the ORMB system then generates financial transactions for the payment lines and books the entries into a subledger (e.g., book of accounts). The process from accepting a payment, distribution to invoice line items, and financial transaction creation is typically performed in a series of batch operations. It can take many hours to process a single payment to an invoice with a large number of line items. Typical benchmarks illustrate that processing a payment request for an invoice with 200,000 lines using the above sequential batch system can take as much as eleven hours to complete. In such cases, an operations team often has to split the payments against such "large" bills to multiple "smaller" chunks to manage the situation or run the payment distribution process over the weekend to accommodate the time required to process the payments. Neither solution is a best practice and can lead to reconciliation and audit issues. Further, any exceptions or failures occurring during a run of a particular payment can hold up processing for all subsequent payments for the same customer, thereby delaying payment realizations and an inaccurate book of accounts.

BRIEF DESCRIPTION OF THE DRAWINGS

Embodiments of the present invention may be better understood by referencing the accompanying drawings.

FIG. 4 illustrates exemplary information that can be included in a set of payment instructions stored in billing system database.

FIG. 7 illustrates an example of a result of classifying an input dataframe and assigning priorities, in accord with embodiments of the present invention.

FIG. 8 illustrates an example of partitioned payment instructions subsequent to pre-processing by an executor, in accord with embodiments of the present invention.

FIG. 9 illustrates an example of a state of the partitions after payment lines are derived, in accord with embodiments of the present invention.

FIGS. 10A and 10B illustrate an example of a result of re-partitioning of the payment lines obtained from the previous stage into five partitions, in accord with embodiments of the present invention.

FIGS. 11A and 11B illustrate an example of each partition with financial transactions, in accord with embodiments of the present invention.

FIGS. 12A and 12B illustrate an example of each partition with financial transactions after the freeze stage, in accord with embodiments of the present invention.

FIG. 13 illustrates an example of three partitions created with one payment status record each, in accord with embodiments of the present invention.

The use of the same reference symbols in different drawings indicates identical items unless otherwise noted. The figures are not necessarily drawn to scale.

DETAILED DESCRIPTION

A method, system, and computer-readable medium are provided for high-speed, high-volume payment processing for transaction environments having a large number of customers. Embodiments reduce the time required to apply payments against large invoices having, for example, hundreds of thousands of invoice lines through the use of a parallel processing methodology coupled with redistribution of tasks among the various processors in order to optimize available processing power. Embodiments thereby provide a scalable payment processing system that reduces the time required to match payment entries against high volume invoices. Embodiments provide a solution to an existing issue that increasing a number of threads executed (e.g., by increasing CPU cores) for a payment-matching operation against a large invoice does not necessarily reduce processing time needed to complete the operation due to a whole payment being processed as one unit of work within the context of a single thread.

Figure 1:
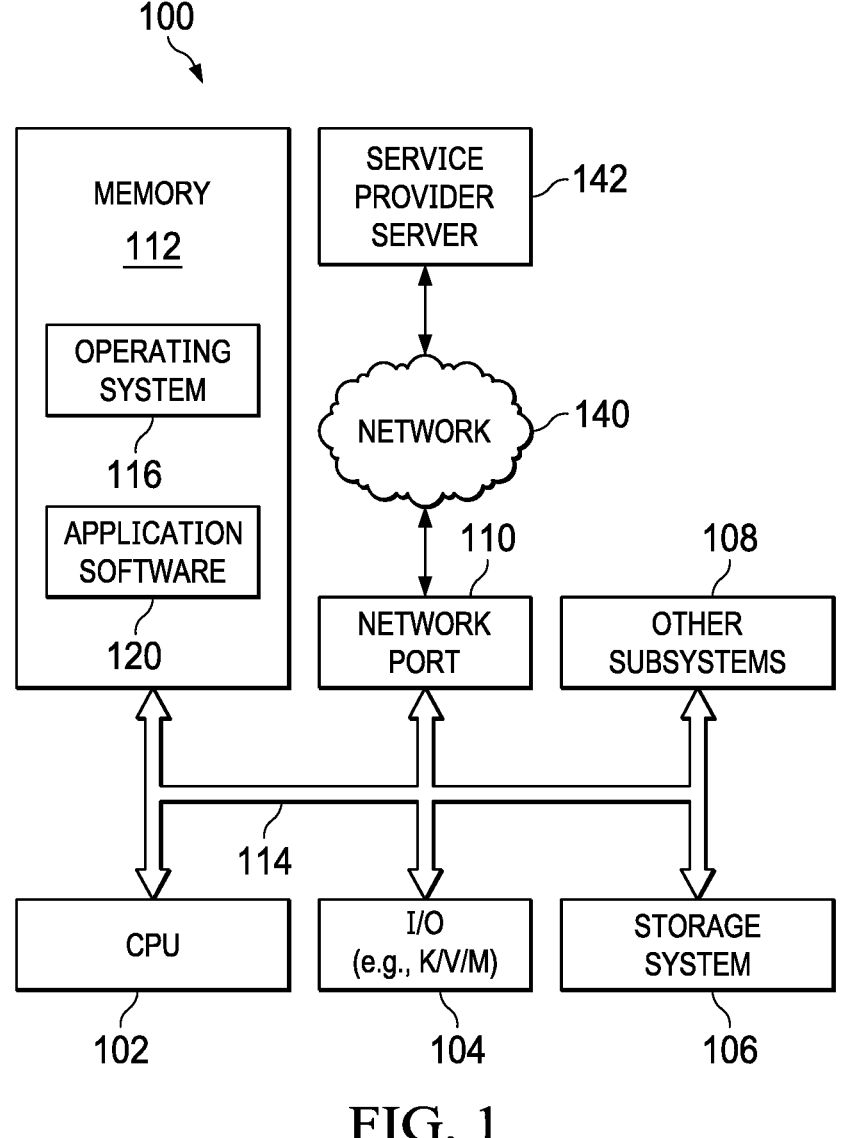
FIG. 1 is a simplified block diagram illustrating an information handling system 100 that can be used to implement embodiments of the present invention.

FIG. 1 is a simplified block diagram illustrating an information handling system 100 that can be used to implement embodiments of the present invention. For the purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system can include volatile and/or non-volatile memory, and one or more processing resources such as a central processing unit (CPU) or hardware or software control logic. Additional components of the information handling system can include one or more storage systems, one or more wired or wireless interfaces for communicating with other networked devices, external devices, and various input and output (I/O) devices, such as a keyboard, a mouse, a microphone, speakers, a track pad, a touchscreen, and a display device (including a touch sensitive display device). The information handling system may also include one or more buses operable to transmit communication between the various hardware components.

For the purposes of this disclosure, computer-readable media can include any instrumentality or aggregation of instrumentalities that retain data or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), or flash memory; as well as communications media such as wires, optical fibers, microwaves, radio waves, and other electromagnetic and/or optical carriers; and/or any combination of the foregoing.

As shown in FIG. 1, the information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which may be accessible by a service provider server 142. The information handling system 100 likewise includes system memory 112, which is interconnected to the foregoing via one or more buses 114. System memory 112 further includes operating system (OS) 116 and in various embodiments may also include application software 120. In certain embodiments, the application software 120 configures the operation of the information processing system 100 as a driver in a parallel processing environment. In certain embodiments, the application software 120 configures the operation of the information processing system 100 as a worker in the parallel processing environment, in certain embodiments, the application software 120 configures the worker with one or more executors used in the parallel processing environment. In certain embodiments, the information handling system 100 is able to download the application software 120 from the service provider server 142. In another embodiment, the information handling system 100 is configured to provide the application software 120 as a service from the service provider server 142.

Figure 2:
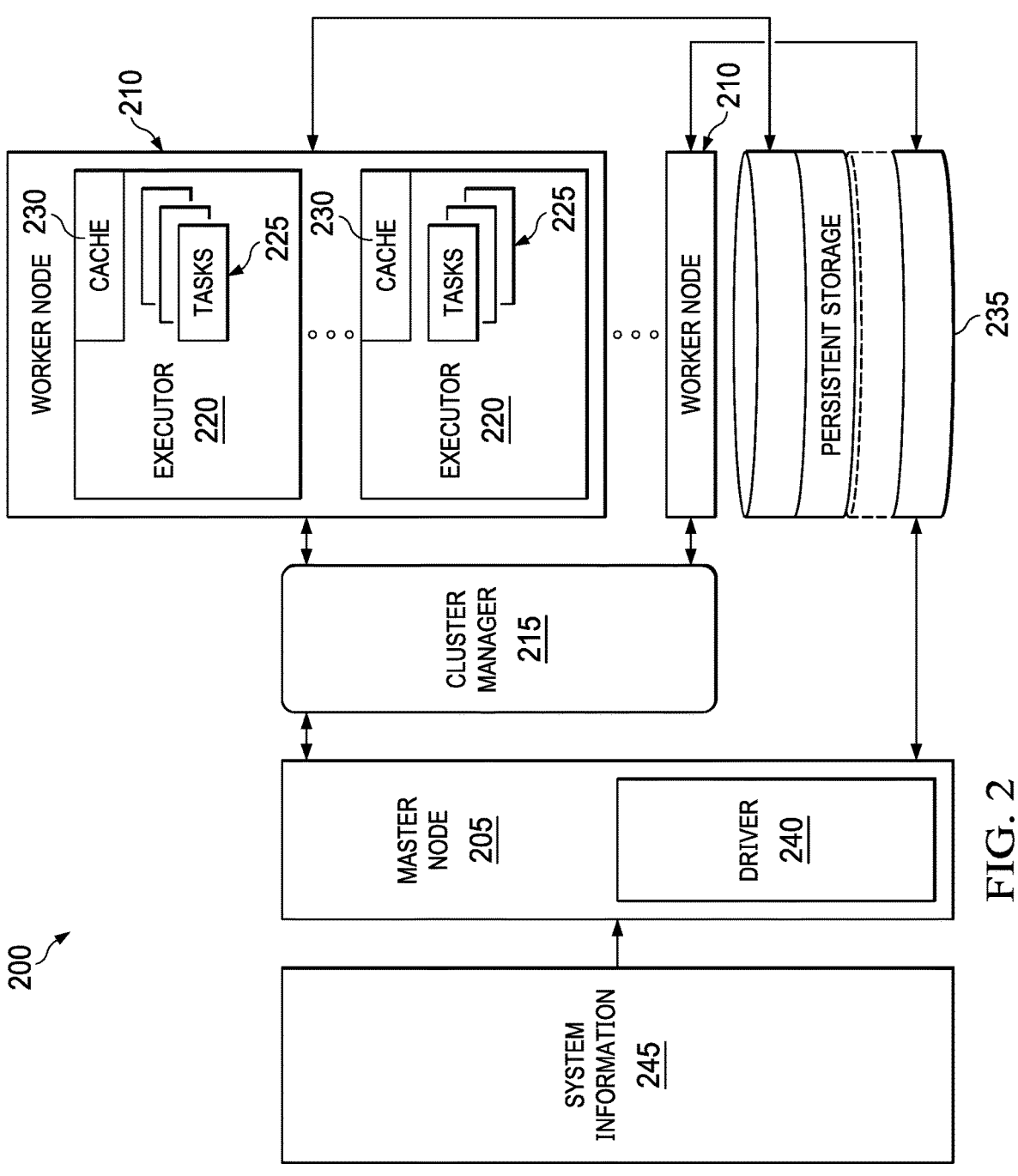
FIG. 2 is a simplified block diagram illustrating a processing cluster that can be used to implement embodiments of the present invention.

FIG. 2 is a simplified block diagram illustrating a processing cluster 200 that can be used to implement embodiments of the present invention. In certain embodiments, processing cluster 200 can be implemented using an Apache SPARK application executed on a YARN managed multi-node cluster each with multiple CPU(s). Apache SPARK is an open source, general-purpose distributed computing engine used for processing and analyzing a large amount of data. SPARK can distribute data across a computing cluster and process data in parallel. YARN is an example of a large-scale, distributed operating system configurable for big data applications. YARN can provide cluster management capability in an open-source distributed processing framework.

As illustrated, cluster 200 includes a master node 205, a plurality of worker nodes 210, and a cluster manager 215. Master node 205 and worker nodes 210 can execute on separate machines within cluster 200. Each worker node 210 is in communication with the master node 205 and, further, is configured to access data, such as payment information, from a persistent storage 235.

Each worker node 210 includes at least one executor 220 that can process payment instructions retrieved from persistent storage 235. An information handling system operating as a worker node 210 can include multiple processing cores and corresponding RAM, which enables the information handling system to implement multiple executors 220. Multiple processing cores can be assigned to an executor 220 which facilitates execution of a plurality of tasks 225. One executor can run multiple threads and each task operates on a partition. Tasks 225 are executed using a cache memory 230 that is associated with the executor corresponding to the task.

In embodiments of the present invention, master node 205 executes a driver 240, which is responsible for maintaining information about the operation of the applications running on the cluster 200. Driver 240 can further analyze, distribute, and schedule processing of payment instructions among executors 220. Each executor 220 is responsible for carrying out tasks on payment instructions that are assigned by driver 240. Each executor 220 is further responsible for executing code assigned to it by the driver 240, and reporting a state of computation of that executor 220 back to the driver 240. Driver 240 uses information included in a system information file 245 to determine a configuration of the cluster 200. As an example, such system information can include a number of worker nodes 210, a number of cores on each worker node, a number of executors 220 on worker nodes 210, a number of tasks on each executor, and the like.

Figure 3:
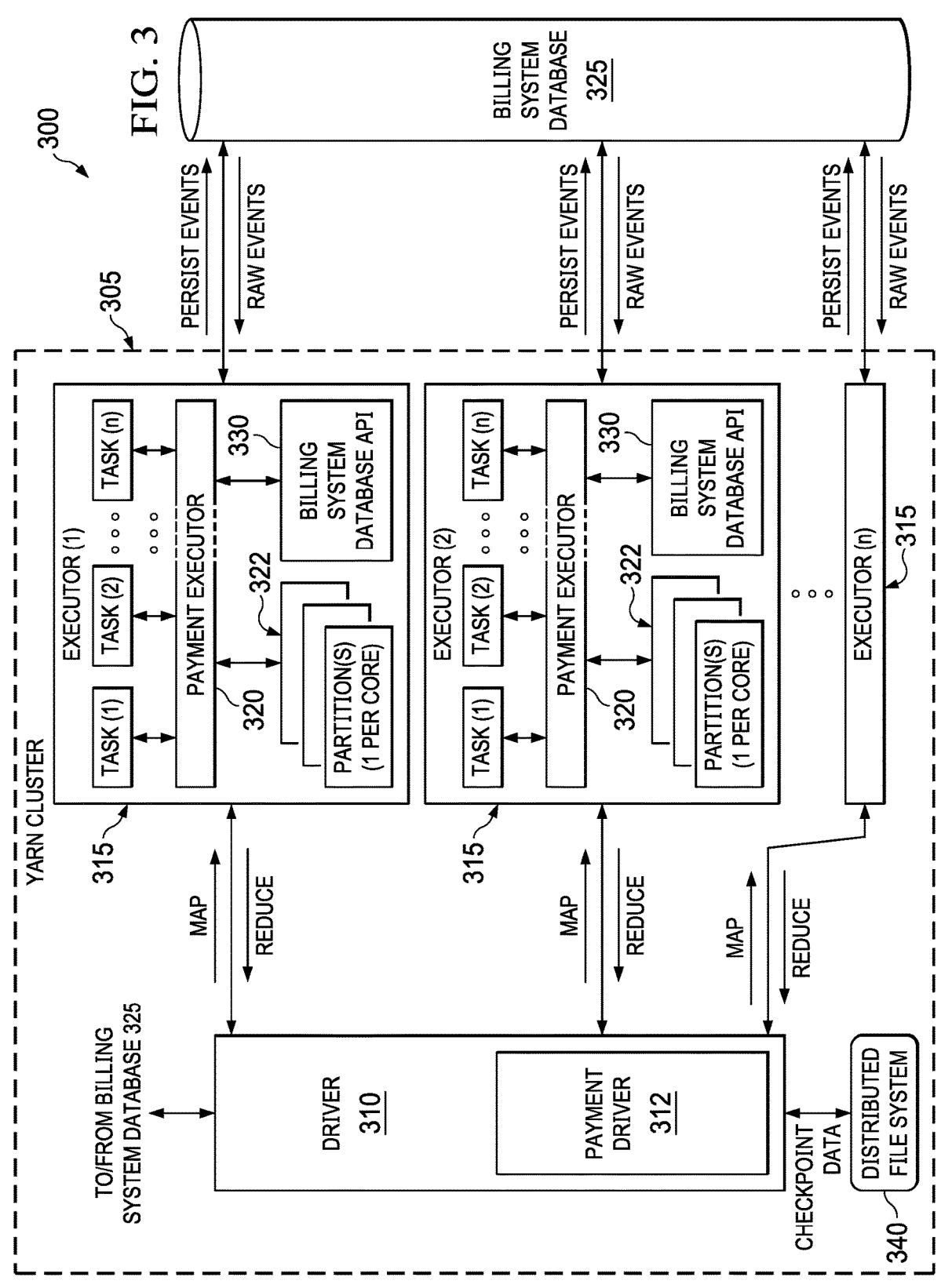
FIG. 3 is a simplified block diagram illustrating an example of a process flow of a system implementing embodiments of the present invention.

FIG. 3 is a simplified block diagram illustrating an example of a process flow of a system 300 implementing embodiments of the present invention. As illustrated, the system is implemented in a SPARK application where billing transaction processing takes place within a YARN cluster 305. It should be noted that embodiments of the present invention are not limited to YARN type clusters, and that other distributed platforms, such as those based on a MESOS cluster, for example, may be used.

YARN cluster 305 includes a driver information handling system 310 executing a payment driver 312. Payment driver 312 is in communication with a plurality of executor information handling systems 315, illustrated as Executor(1) through Executor(n). Each executor information handling system 315 can include a respective payment executor module 320. Payment driver 312 assigns payment instructions to each executor information handling system 315 for processing by the associated payment executor 320. When the payment driver assigns the payment instructions, information regarding such assignments can be checkpointed and stored in a persistent storage, such as a distributed file system 340. Checkpoint information can be used for recovery in an event of a failure during subsequent processing.

As will be discussed more fully below, embodiments provide for each payment executor 320 to validate payment instructions received from payment driver 312 against billing system database 325 and place payment data in at least one partition 322 of the respective executor. Payment executor 320 can then execute a plurality of tasks on the assigned payment data stored in the respective partition 322 (e.g., Task(1)-Task(n), as illustrated). In certain embodiments, an executor 315 can include multiple processing cores. Each processing core can execute processing operations on a single partition 322. In such embodiments, a single executor 315 can execute operations on multiple partitions, where the number of partitions is dependent upon the number of cores.

Parallel processing cluster (e.g., YARN cluster 305) can be incorporated as an add-on to an existing billing system framework. In such instances, formatting of payment instructions stored on a billing system database 325, along with formatting of processed payment lines and financial transactions, are already established by the existing system. In such cases, the parallel processing cluster can be readily designed to handle and process transactions using standards of the existing billing system framework. As an example, a parallel processing cluster can be implemented in association with an Oracle® Revenue Management and Billing (ORMB) framework as a substitute for batch operations executed in a standard ORMB system.

FIG. 4 illustrates exemplary information that can be included in a set of payment instructions 402(x) through 402(n) stored in billing system database 325, in accord with embodiments of the present invention. In the example illustration, a payment instruction 402 includes a unique payment ID 404 (e.g., a reference number of the payment), a customer ID 406 (e.g., a unique identifier for a party that made the payment), a payment date 408 (e.g., a date or time at which the payment was made), a mode of payment 410 (e.g., a payment instrument such as cash, check, e-payment, and the like), a payment status 412 (e.g., an identifier for whether the payment has completed), a payment amount value 420 (e.g., a total payment amount), and an invoice identifier 422 (e.g., an identifier for an invoice associated with the payment instruction). Some embodiments can also include, for example, an origin of the payment identifying a channel or source system from which payment instructions were received, and external reference numbers for the payment.

In some embodiments, a customer can choose to make a payment against a specific invoice, but in certain other embodiments a customer may not specify an invoice while making the payment. In the latter situation, the payment will be applied against all unpaid invoices as per an oldest-debt-first basis. In practice, when a customer pays a specified invoice, the invoice can be paid partially or paid fully or paid in excess. Certain embodiments can also include scenarios in which the same invoice is paid through multiple payments. As an example, a customer can make a cash payment for part of the invoice amount and pay the balance through a check. Embodiments of the present invention are configured to process all such payment scenarios.

In some embodiments of the present invention, payment instructions from customers can be collected and uploaded in bulk to the billing system in a periodic basis (e.g., daily or weekly) to the billing database. In such cases, all payment instructions in the batch are processed in one stretch. Some embodiments support manual payment instructions that are keyed in, for example, by customer service representatives through a billing system user interface directly to the billing system. Embodiments can also support situations in which a customer opts for direct debit as a mode of payment, in which case the billing system generates auto-pay instructions and requests the payment from the customer's designated bank account(s) directly. The payment processing approach described herein is not limited to the above situations and is applicable irrespective of the origin of the payment instructions.

Figure 5:
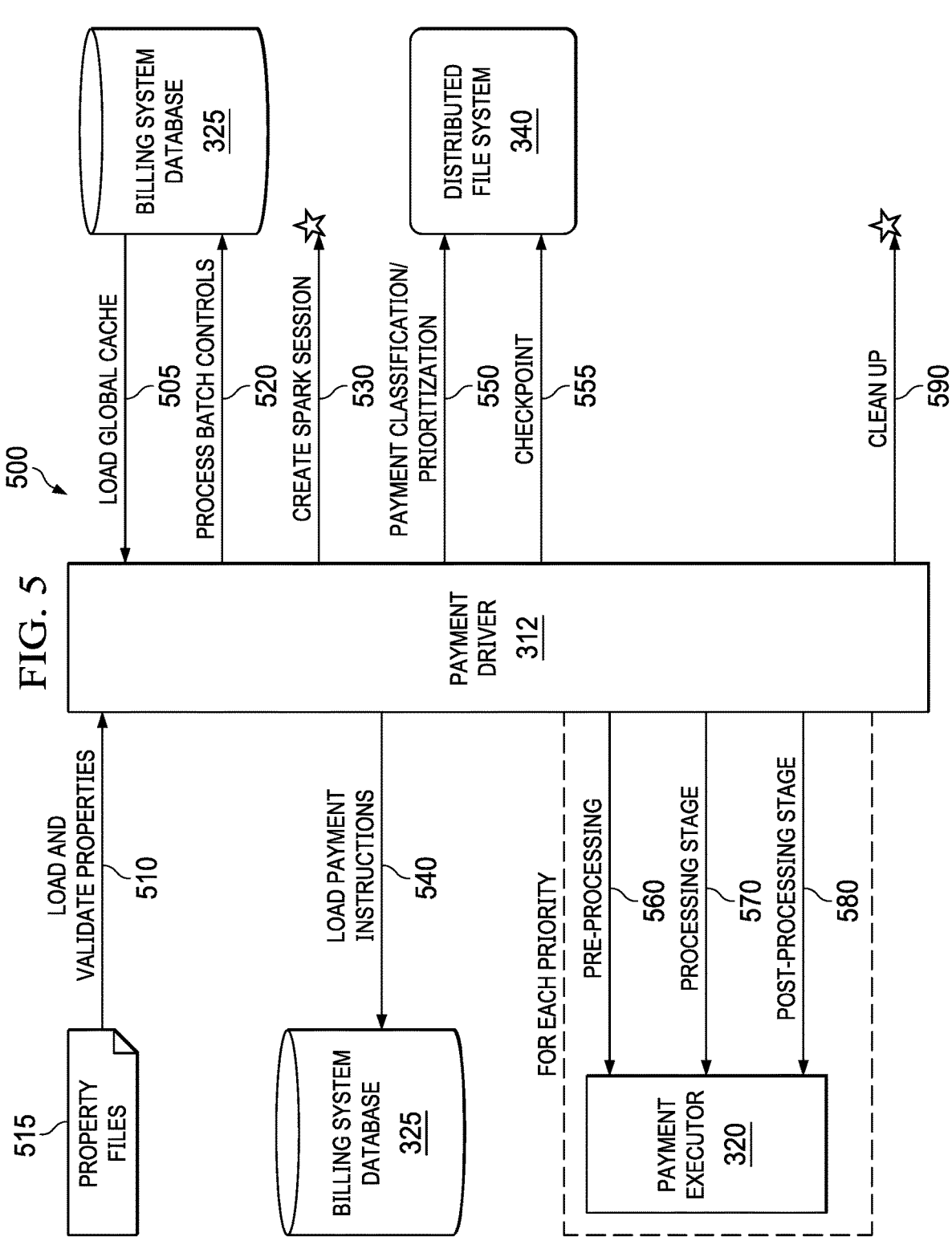
FIG. 5 is a simplified block diagram illustrating an example process flow for a payment driver for providing tasks to executors, in accord with embodiments of the present invention.

FIG. 5 is a simplified block diagram illustrating an example process flow 500 for a payment driver 312 providing tasks to executors 315, in accord with embodiments of the present invention. Payment driver 312 loads and validates properties stored in one or more property files 515 (510). Property files can identify, for example, an amount of memory required by each payment executor 320 to execute associated tasks, a number of payment executors in the cluster to which billing event driver 312 is assigning payment instructions, a number of tasks that can concurrently run per executor, a logical location of billing system database 325, and the like. When payment files are uploaded to the billing system, initial validations are performed during process batch controls (520). In such scenarios, a header can be generated for one batch file of payments. Process batch controls (520) performs checksum and integrity checks to ensure the header tallies with the individual payments in the batch.

As illustrated in FIG. 5, payment driver 312 can spawn a payment processing session (530). In one embodiment, the payment processing session can be spawned as a SPARK application. The payment driver can communicate with billing system database 325 to initialize a global distributed cache that stores reference data and rules needed for payment processing (505). The global distributed cache is subsequently available to each executor 315 for associated processing (e.g., customer information, cancellation reasons, plug-in extension points, and the like).

Payment driver 312 can load all payment instructions in 'PENDING' status from billing system database 325 (540). FIG. 4 shows an example of input payment instructions and corresponding invoice data. Once payment instructions are loaded, payment driver 312 classifies the payment instructions and can assign a priority (e.g., 1 to N) to each instruction (550). Based on the associated priority, payment instructions are placed into priority buckets. Each bucket has a unique priority number. Classification identifies and resolves dependencies among payment instructions. The need for classification arises as multiple payments made against a same invoice and same party can only be applied sequentially to avoid reconciliation issues. If there is more than one payment made by a customer against a same invoice, each payment would be put into different priority buckets based on the order in which the payments are received. In one embodiment, after classification, all independent payments will end up in the highest priority bucket and any other payments will be placed in subsequent buckets having a lower priority. All payments within a same bucket are processed in parallel, while the buckets themselves will be processed sequentially in order of priority. Classified payment instructions can be checked pointed and stored in a persistent storage (555), such as distributed file system 344 recovery in case of any failures during subsequent processing. As will be discussed below, FIG. 7 illustrates an example of classified and prioritized payment instructions.

After payment classification and prioritization, payment driver 312 distributes each priority bucket in the order of assigned priorities for processing. Payment driver 312 assigns a subset of the payment instructions in the current bucket to each executor 315. In certain embodiments, each executor 315 can be assigned a different set of payment instructions that the executor is to process. Payment driver 312 can direct an executor 315 to initiate executing pre-processing tasks on the assigned payment instructions (560). As will be discussed in greater detail below, pre-processing can include validating the instruction against reference data and also identifying the action to be taken on the data (e.g., create, cancel, cancel and re-create) based on the payment instruction. In some embodiments, once the executors have completed pre-processing of the assigned payment instructions, pre-processed payment records are transmitted back to payment driver 312.

Payment driver 312 can then direct executors 315 to process payments assigned to partitions 322 of the executors (570). Distribution of the payments among the executor processors during processing can be the same as or different from the distribution during pre-processing. As will be seen below, the number of records for processing can change from the number of records in pre-processing due to different organization (e.g., payment record order versus invoice line order). By redistributing the records, more efficient use of the available processors in each executor can be made at each processing step.

The processing phase can include, for example, creation/identification of payment lines, distributing the payment lines, creation of financial transactions, and freezing financial transactions. When executors 315 have completed processing, payment driver 312 can initiate post-processing (580). As will be discussed in greater detail below, during postprocessing, payment driver 312 can execute any tasks associated with closing the processing session with billing system database 325. Again, records associated with post-processing can be redistributed over the available processors in the executors to make efficient use of the available processing capacity. Billing event driver 312 can then close the session during which the checkpoint data is deleted and caches are cleaned (590).

Figure 6A:
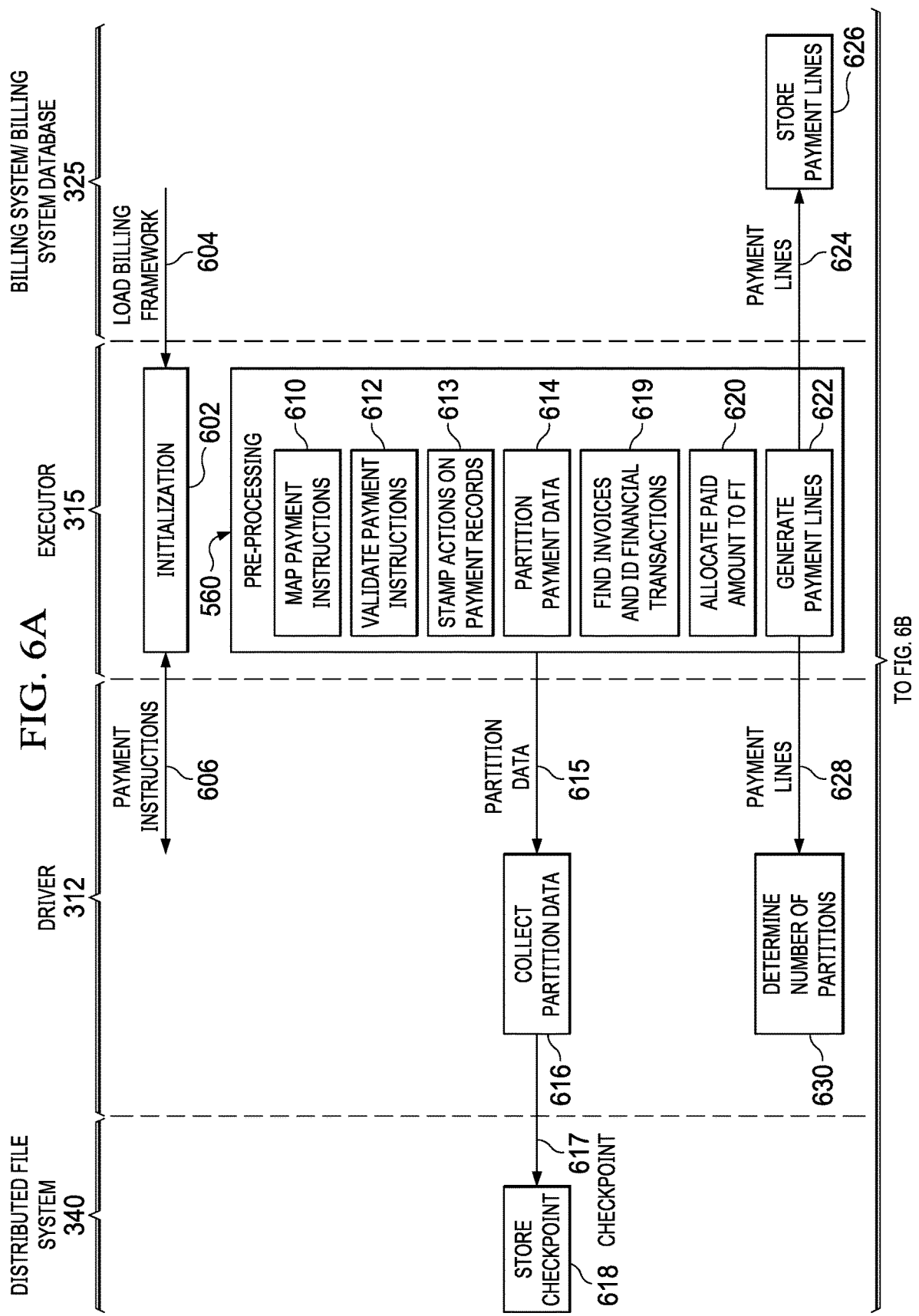
FIGS. 6A and 6B are a simplified block diagram illustrating an example of a payment creation process flow for the driver and executor, in accord with embodiments of the present invention.
Figure 6B:
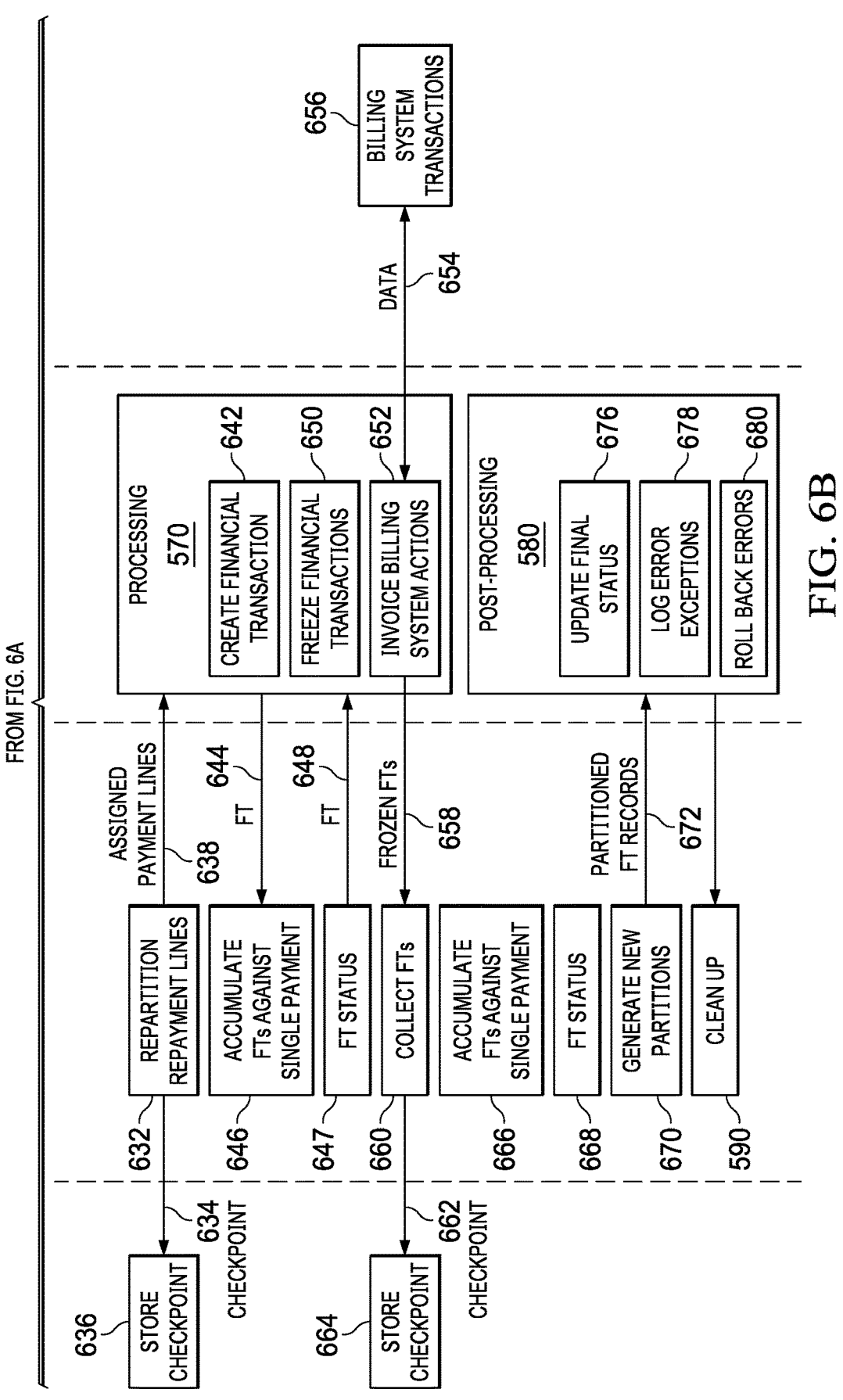

FIGS. 6A and 6B are a simplified block diagram illustrating an example of a payment creation process flow for the driver and executor, in accord with embodiments of the present invention. Executor 315 begins the process through initialization (602) in which the executor loads required external billing framework artifacts (604) from the billing system (e.g., property files 515) that support or define billing system database 325. During initialization, executor 315 performs various prerequisites required for operation, including, for example, establishing a connection with billing system database 325 and the rest of the billing system framework. During the initialization process, executor 315 can receive instructions from driver 312 to initiate pre-processing, which can include accessing payment instructions assigned to the executor (606).

Pre-processing stage 560 involves receiving the payment instructions from input, validating, and returning validated payment records as output. Pre-processing can include a mapping operation (610) in which payment instructions are mapped to payment records. Each payment executor 320 can then validate the payment instructions against billing system database 325 (612). Payment executor 320 can then stamp an action (e.g., create, cancel, or cancel and re-create) to be taken on the payment record (613). The payment executor can then place the payment data in at least one respective partition 322 of executor 315 (614). The partition data can be provided to driver 312 (615), which will collect the partition data (616) and provide the checkpoint (617) to distributed file system 340 for storage (618). The checkpoint data is stored to be used in case a recovery operation is needed in light of any failure in subsequent processing. In an alternative embodiment, driver 312 can determine the partitioning of the various records and provide distribution information to executor 315.

Referring back to FIG. 3, payment executor 320 can execute a plurality of tasks on an assigned payment in a respective partition 322 of executor 315 (e.g., Task(1) through Task(n)). In some embodiments, if an action to be taken is new payment creation, then payment executor 320 can determine a list of invoices against which a payment should be adjusted, access those invoices from the billing system database, and identify unpaid debit charges ("financial transactions") for each of the invoices identified in an order of oldest-debt first (619). The total paid amount can then be spread across the list of unpaid debts in the identified amount until the total adjusted amount is equal to the total paid amount or until there are no further unpaid line items (620). If there is an excess amount after adjusting all unpaid debits, then the balance paid amount is held at the customer level as an excess and can be adjusted against future debits. For each invoice line item against which a portion of a payment was allocated, a payment line is created by the executor (622). If an action is for cancellation, then payment lines created for the payment to be canceled retrieved from the billing system database and returned to the driver.

Upon creation of the payment lines by payment executor 320, the payment line data) can be provided (624) by executor 315 to billing system database 325 for storage (626). As will be discussed in further detail below, each newly generated payment line will include a unique identifier. In some embodiments, the payment line identifier can have three parts: (i) a service or charge identifier for the unpaid debt against which the payment line is adjusted, (ii) a partition identifier, and (iii) a thread-safe random number. In such embodiments, the length of the first two parts and the total length can be specified as required by the billing system.

The payment lines can also be provided by the executor to driver 312 for additional processing. After the payment lines are collected by driver 312, the driver recalculates the number of partitions to be used for processing (630). This is done because the unit of work at this point in the process is change from payment instruction to payment lines. Based upon the total volume of payment lines and the maximum allowed number of payment lines per partition, driver 312 distributes the payment lines uniformly to the number of partitions (632). In this manner, more effective use of the available processor capacity is made than by using the same processor throughout pre-processing and processing. At this point, the repartitioned payment lines can be provided to distributed file system 340 as a checkpoint (634) to be stored in case a recovery is needed in light of any failure during subsequent processing.

Processing stage 570 begins when executor 315 receives the assigned payment lines (638) from driver 312. The payment lines are distributed by the executor to the indicated partitions for processing by the processor associated with the partition.

Tasks that can be performed during processing stage 570 include creation of financial transactions from the received payment lines (642). In some embodiments, each financial transaction can have two sides—"regular" and "contra." Each side of the financial transaction will exactly tally with its counterpart but will have an opposite sign (e.g., a financial transaction of value $50 will have a regular ledger entry for +50$(Db) and a contra entry of =50$(Cr). When the financial transaction and corresponding ledger entries are prepared, they are validated against the billing system database and against a corresponding payment line. If the payment line has a cancel action, executor 320 can also delink any previous financial transactions, attach the payment line, and update the billing system database.

Each newly created financial transaction can have a unique identifier. In some embodiments, the financial transaction identifier can have three parts: (i) payment line identifier from which the financial transaction is generated, (ii) partition identifier, and (iii) a thread-safe random number.

Generated financial transactions are then transmitted to driver 312 (644). Driver 312 collects back the financial transaction information and accumulates all financial transactions against a single payment (666) and determines the status of the financial transaction (647). Accumulation operation 646 counts a total number of errors in financial transactions and payment lines for each payment. If there are any errors for the payment, the status of the payment is marked as an error. If all financial transactions of a payment are valid, then the payment status remains valid. The financial transactions and statuses are then sent back by driver 312 to executor 315 for further processing.

Upon receiving the financial transactions from the driver, payment executor 320 can continue execution of processing tasks, including freezing each financial transaction (650) and invoking any subsequent actions to be performed by the billing system (652). Freezing 650 validates the financial transaction information against the billing system information. During this process, payment executor 320 keeps track of errors encountered during the freezing. Data is provided to the billing system (654) for any additional billing system actions that need to be performed. Once those actions are performed, the frozen financial transactions are returned to driver 312 (658).

Driver 312 can then collect the frozen financial transaction data from the various executors (660). The frozen financial transactions can be checkpointed and provided to distributed file system 340 (662) for storage (664) to aid in recovery in the event of a failure during subsequent processing. After checkpointing, driver 312 can accumulate all financial transactions against a single payment to determine a final status (666). Accumulation operation 666 counts the total number of errors encountered during freezing financial transactions for each payment. If there are errors for any of the financial transactions of the payment, again the status of the payment is marked as an error (668). If all financial transaction payments are valid, then the payment status remains as valid.

Driver 312 then can create a new set of partitions using generated pay tender status records (670). These partitions can then be provided to executors 315 for post processing (672). Once again, the redistribution of records is performed to make most effective use of the available parallel processing capability in light of a different number of records to be processed at this stage. Post-processing stage 580 can accept a pay tender status record as an input. The partition level for post-processing is the pay tender status, and updates all required information to the database. Based on the payment status, executor 315 updates the final status of the associated payment instruction (676). If the payment is in error, associated exceptions can be logged (678) and any previous information stored for the associated payment can be rolled back to an original state (680). At this point control can be passed back to driver 312.

Driver 312 and then carry out final cleanup steps (590). Cleanup can include closing the processing session, removing or destroying the global cash, and removing the check-pointed files from distributed file system 340 and other process metadata.

The above discussion regarding FIGS. 6A and 6B is related to processing of payment creation records. A substantially similar flow is utilized for a transfer payment request where the source payment is to be canceled. During pre-processing 560, cancel payment instructions are received (606). These cancellation instructions are validated (612) and the associated payments to be canceled are identified and cancel payment records are generated (614). Subsequently the cancel payment records are used to identify cancel payment lines associated with the cancel payment records (622). These cancel payment lines are partitioned among the executors (632) and then processing 570 is performed. This includes freezing the cancel payments (650) by inputting payment cancel lines, releasing the existing financial transactions linked to the cancel payment lines, creating a new financial transaction for the cancellation, validating that financial transaction, freezing, and returning the frozen financial transactions as output. Subsequently, driver 312 accumulates the cancel financial transactions to determine a final status of the cancel payment (666 and 668). Finally, during post-processing 580, the payment status record is used as an input to update all required information in billing system database 325. If the status is an error, all information from previous stages of rolled back and an exception is logged.

In some scenarios, an action identified against a payment instruction can include both a cancel and a re-create. This can happen, for example, in the instance of a payment transfer where an existing payment needs to be canceled for an original party or invoice and reassigned to another party or invoice. In such scenarios, the single payment instruction is internally considered as two sub-instructions, one having an action of "cancel" and a higher priority and then a second instruction with lower priority having an action as "create" against the new party or invoice. Thus, this scenario can be processed as to passes of the payment instruction through the system. In the initial pass, the cancel action of the payment instruction against the original party or invoice takes place, and in the subsequent pass the re-creation of payment against the new party or invoice is performed.

FIGS. 4 and 7 through 13 show transactions at various stages of processing, in accord with embodiments of the present invention. FIG. 4, as previously presented, illustrates an exemplary input dataframe of payment instructions 400. In this example, input 400 includes four payment instructions identified as P1-P4. It should be recognized that embodiments are not limited to this number of input instructions and embodiments can process millions of payment instructions. In certain embodiments, the payment instructions are stored in a persistent storage of a billing system (e.g., billing system database 325) or provided by a driver 312.

FIG. 7 illustrates an example 700 of classifying an input dataframe 400 and assigning priorities (e.g., step 550 in FIG. 5). In the example, two priority buckets 710 are identified— a first priority bucket (1) having three payment instructions
and a second priority bucket (2) having one instruction. In
the example, Payment P2 is placed in second priority
because P2 is made by a same customer C1 against a same
invoice I1 but arriving after P1. Hence, P1 and P2 can only
be processed sequentially, as they are dependent. After
prioritizing (550), each priority bucket can be processed
(e.g., 560-580) and driver 312 assigns the payment instruc-
tions in the chosen priority bucket to partitions based on the
volume of instructions in the bucket and number of tasks that
can be concurrently run in the whole cluster (e.g., step 614
in FIG. 6). In the illustrated example, three partitions are
created for Priority 1: Partition 1 includes transactions P1,
Partition 2 includes P3, and Partition 3 includes P4.

In some embodiments, partitions can be executed by
separate executors 315 (e.g., Partition 1 by Executor(1) and
Partitions 2 by Executor(2) in FIG. 3). Alternatively, parti-
tions can be processed as parallel tasks using threads
executed by the same executor 315. While three partitions
are discussed above, it should be recognized that embodi-
ments are not restricted to a number of partitions that can be
executed. A number of partitions for a particular implemen-
tation can be determined in light of the number of payment
instructions to be processed in parallel and the nature of the
available hardware.

FIG. 8 illustrates an example 800 of partitioned payment
instructions after pre-processing 560 by executor 315. As
discussed above, executors 315 can execute a pre-process
phase (e.g., 560) that includes validation of payment instruc-
tions in the assigned respective partitions (e.g., 612). In such
cases, all payments have qualified validation criteria. But
payment instructions may fail validation process and will
then be marked invalid and excluded from further process-
ing. In some embodiments, pre-processing can also identify
actions to be performed based on the payment instruction,
which can be one of (i) create, (ii) cancel, or (iii) cancel and
re-create. As illustrated in FIG. 8, all payments are marked
for creation ("create") subsequent to pre-processing (e.g.,
"Action" column entries 810, 820, and 830).

FIG. 9 illustrates an example 900 of state of the partitions
after payment lines are derived (e.g., 622). In the illustrated
example, Partition 1 contains Payment P1 with total amount
of 50$ (910). Five invoice lines IL1, IL2, IL3, IL4, and IL5
(912) of Invoice I1 are provided, for which each has 10$
identified as an unpaid debit to be offset by Payment P1
(914). Similarly, for Payment P3 in Partition 2 (920), where
a payment of 50$ is made against invoice I2, the identified
payment lines (922) are IL11 through IL15 and 10$ is made
against each line (924). In case of Payment P4 (Partition 3
(930)), which is 60$ made against invoice I3 of 40$, the
excess 20$ (934) after offsetting invoice lines IL16 through
IL19 (932) is created as a separate payment line (936). Thus,
from three input payment instructions in FIG. 10, fifteen
payment lines are generated by all the executors combined.

As discussed above, payment is processed in order of
oldest debit first. For example, an alternative scenario can
have three unpaid debits: 10$, 20$, and 15$ in order of date.
If a payment of 25$ is made, then the 10$ debit will be fully
paid off, and the remaining 15$ of the payment will be
applied to the 20$ debit, which will remain partially paid and
the last 15$ debit will remain fully unpaid. When a second
payment is received, a 20$ line, with outstanding 5$ and
15$, will again appear on a list of unpaid debits.

FIGS. 10A and 10B illustrate an example 1000 of a result
of re-partitioning of the fifteen payment lines obtained from
the previous stage into five partitions (e.g., 632). Driver 312
can calculate a number of partitions based on a system parameter specifying an allowed size of a partition. In the
illustrated example, the partition parameter has a value 3,
which indicates a maximum size of a partition can only be
three lines. This setting can be dependent on memory
available to an executor 315 and number of parallel tasks
(e.g., Task(1)-Task(n)) executing within an executor. After
re-partitioning, the resultant partitions (1010, 1020, 1030,
1040, and 1050) can be assigned to executors 315 to stamp
payment line ID (1012, 1022, 1032, 1042, and 1052) and
persist in billing system database 325. In the example,
payment line IDs are generated from service identifiers of
the invoice line and partition ID (padded to three digits)
operations and a thread-safe random number. In the example
S1-001-01, "S1" is a service identifier for invoice line IL1,
"001" is the partition ID padded to 3 digits, and 01 is a
random number padded to 2 digits. A required length of the
first two portions of the payment line ID and the total length
are configurable as system parameters. In the example for
the payment line for the excess amount of 20$ (1044), since
there is no invoice line associated, instead of a service ID
(e.g., "S1"), this payment line is assigned a prefix derived
from an identifier of a party who made the payment (e.g.,
"C3").

Once the payment lines are created, driver 312 directs
executors 315 to process the payment lines to create the
financial transactions for each of the payment lines (e.g.,
642). Each financial transaction contains associated debit
and credit entries.

FIGS. 11A and 11B illustrate an example 1100 of each
partition with financial transactions. Each financial transac-
tion has a unique identifier (1112, 1122, 1132, 1142, and
1152). In the illustrated example, financial transaction IDs
are generated from the payment line ID and partition ID (left
padded with zero to 3 digits) and a thread-safe random
number. For example, financial transaction ID S1-001-56
(1114) is generated from the associated payment line ID by
taking a prefix from the payment line (e.g., "S") followed by
partition ID (e.g., "1") left padded to 3 digits with a zero,
followed by thread safe random number (e.g., "56"). The
required length of the first two portions and the total length
can be configurable as system parameters. The financial
transactions are also validated during this operation and the
status (1116, 1126, 1136, 1146, 1156) is marked as invalid if
it fails the validation criteria. In the example shown all
created financial transactions are valid.

Driver 312 collects back the created financial transactions
(e.g., 644) and accumulates all the financial transactions for
a payment (e.g., 646) to determine the final status (e.g., 647).
If all financial transactions of a payment are valid, the driver
re-assigns the same partition to executors 315 for freezing
operations (e.g., 650). Once an executor receives the asso-
ciated partitions, the executor checks the status of the
associated payment. If a payment is in error, then the freeze
is skipped for the associated financial transactions. On the
other hand, for valid payments from the previous stage, the
associated financial transactions are frozen. The financial
transactions can then be persisted to billing system database
325 by the executor, and any other actions to be done post
freezing of a financial transaction are triggered (e.g., 652 and
654). If there are any errors during the freeze process, the
financial transaction status is marked as an error.

FIGS. 12A and 12B illustrate an example 1200 of each
partition (1210, 1220, 1230, 1240, and 1250) with financial
transactions after the freeze stage. In this example, each
financial transaction's status (1212, 1222, 1232, 1242, and
1252) indicates the transaction is "frozen." Driver 312
collects back the frozen financial transactions from executor 315 (e.g., 660) and accumulates all the financial transactions for a payment (e.g., 666) to determine a final status (e.g., 668). After the accumulation stage, driver 312 generates payment status records and assigns them into partitions (e.g., 670).

FIG. 13 illustrates an example 1300 of three partitions created with one payment status record each, which is similar to the number of partitions in the pre-processing stage illustrated in FIG. 8. As granularity of the data changes from payment line back to payment, this results in a lesser number of partitions and can change the number of records per partition. In the illustrated example, one payment status record per partition is assigned. After these partitions are generated, driver 312 assigns the records back (e.g., 672) to the executors 315 for post processing (e.g., 580).

When an executor receives a partition for post-processing, the final status of the original input payment instructions is updated to, for example, "complete" or "error." This is based on the status of the payment status record in the partition (as illustrated in FIG. 13, either "frozen" or "error"). In a scenario in which there is an error payment (e.g., 1320), an exception is logged to billing system database 325 (e.g., 678) and any previous data that has been persisted or stored will be reverted and rolled back (e.g., 680). Once post-processing operations have been completed, the executor can pass control back to driver 312, which will the perform clean-up operations (e.g., 590) and the process completes.

The above steps all relate to the Priority 1 records from FIG. 7. Once the Priority 1 records are processed, then the next higher priority records are processed (e.g., Priority 2 record associate with Payment ID P2 of FIG. 7). The processing is the same as discussed above for these records. Further, should there be any other priority records, those will be processed in turn. This allows for payments dependent upon others, to be processed in the correct order.

The embodiments of the present invention, as described herein, provide a high-speed, high-volume payment processing system for transaction environments having a large number of customers by parallel processing each payment instruction. Through redistribution of payment records among processors as the information in those records are processed to different granularities (e.g., payment instructions, payment lines, and payment status records), the system optimizes use of parallel computing resources in the various stages of processing payment entries (e.g., the number of executors being utilized and the number of available processors in each executor). This improves system efficiency and scalability over prior art systems that do not utilize parallel processing resources or do not redistribute processing stages. The time is thus significantly reduced for application of payments against large invoices as well as the time required to match the payment entries, in some cases by several orders of magnitude, thereby enabling better use of machine and monetary resources.

By now it should be appreciated that there has been provided a computer-implemented method for executing high-speed payment processing in a cluster of information handling systems. The method includes: pre-processing a set of payment instructions by an executor node of the cluster of information handling systems where the executor node is configured to process data stored in one or more data partitions, each data partition is associated with a corresponding processor of the executor node configured to process the data stored in the data partition, and each payment instruction includes a payment identifier, customer identifier, an invoice identifier, and a payment amount; and processing a set of payment lines by the executor node generated during said pre-processing where the payment lines are identified for distribution among the partitions by a driver node of the cluster of information handling systems, and each payment line includes a unique payment line identifier, the customer identifier, the payment identifier, the payment amount, and invoice line identifier, and a payment line amount. The pre-processing includes: associating each payment instruction with a corresponding invoice identifier; for each payment instruction having a same customer identifier and invoice identifier, prioritizing the payment instruction in order of receipt from a customer associated with the customer identifier; assigning each payment instruction having a common priority to a data partition for processing in order of priority; for each payment instruction, by the processor corresponding to the associated data partition, locating an invoice associated with the invoice identifier where the invoice is stored in a billing system database communicatively coupled to the executor node, generating an invoice line from the invoice for each unpaid amount in the invoice, and generating a payment line where a sub-payment amount is allocated to each invoice line and the sub-payment amount is a portion of the payment amount of the associated payment instruction. The processing includes: generating a financial transaction record corresponding to each payment line where each financial transaction includes a unique financial transaction identifier, each field of the associated payment line, and a status of the financial transaction associated with the validation of the financial transaction; freezing each valid financial transaction; and transmitting each frozen financial transaction to the billing system database for storage.

In one aspect of the above embodiment, said assigning each payment instruction having a common priority to a data partition for processing further includes determining a number of payment instructions associated with the common priority, and evenly dividing the number of payment instructions associated with the common priority among a number of data partitions available on the executor node. In another aspect of the above embodiment, allocating the sub-payment amount to each invoice line further includes applying the payment amount to each invoice line up to the unpaid amount in the invoice line, and generating an excess payment line including an excess payment amount when the payment amount exceeds a total unpaid amount from all invoice lines.

In another aspect of the above embodiment, the pre-processing further includes identifying an action for processing from each payment instruction where an action can be one of create, cancel, and cancel and re-create, and marking the action for processing in the corresponding payment line. In still another aspect of the above embodiment, the pre-processing further includes validating a payment instruction assigned to a partition against a record in the billing system database, and marking a result of said validating in the payment instruction. In another aspect of the above embodiment, the pre-processing further includes transmitting the partitioned payment instructions to the driver node for storage as a first checkpoint.

In one aspect of the above embodiment, the unique payment line identifier includes a service identifier associated with the invoice line, a partition identifier, and a padded random number. In another aspect of the above embodiment, the unique financial transaction identifier includes a portion generated using the unique payment line identifier, a partition identifier, and a padded random number.

In yet another aspect of the above embodiment, the processing further includes invoking one or more billing system operations, and transmitting the financial transaction and billing system invocation commands to a billing system node. In still another aspect of the above embodiment, the processing further includes inserting a status identifier in the financial transaction record indicating that a valid transaction is frozen after said freezing the valid financial transaction record, and skipping freezing an invalid financial transaction record and inserting a status identifier in the financial transaction record indicating that the invalid financial transaction record is not frozen.

In still another aspect of the above embodiment, the driver node identifies the payment lines for distribution among the partitions by a method including calculating an available number of partitions using a parameter specifying a maximum number of lines per partition, and assigning each payment line among the available number of partitions. In another aspect of the above embodiment, the method further includes post-processing a set of payment status records where each payment status record is generated from the frozen financial transaction records by the driver node and each payment status record is distributed among the partitions in accord with payment status distribution instructions received from the driver node. The post-processing includes updating a final status of each payment status record, logging and error in a payment status record to the billing system database, and performing recovery operations from the error in the payment status record.

Another embodiment of the present invention provides a system for executing high-speed payment processing. The system includes a cluster of information handling systems that includes a driver information handling system configured to execute a payment driver module and one or more executor information handling systems coupled to the driver information handling system, and a billing system communicatively coupled to the cluster of information handling systems and including a billing system database. Each executor information handling system includes one or more data partitions configured to store data, a payment executor module, and one or more processors communicatively coupled to the payment executor module where each processor is associated with a corresponding data partition of the one or more data partitions. The payment executor module is configured to execute instructions for: receiving a set of payment instructions where each payment instruction includes a payment identifier, customer identifier, and invoice identifier, and a payment amount; pre-processing the set of payment instructions where the pre-processing includes associating each payment instruction with a corresponding invoice identifier, for each payment instruction having a same customer identifier and invoice identifier, prioritizing the payment instruction in order of receipt from a customer associated with the customer identifier, and assigning each payment instruction having a common priority to a data partition preprocessing in order of priority; and, distributing to data partitions, after said pre-processing the set of payment instructions, a set of received payment lines generated from the pre-processed payment instructions. Each processor of the one or more processors is configured to execute instructions for pre-processing the assigned payment instructions in the associated data partition, and processing payment lines distributed to the associated data partition. Pre-processing the assigned payment instructions includes: locating an invoice associated with the invoice identifier where the invoice is stored in a billing system database communicatively coupled to the executor node; generating an invoice line from the invoice for each unpaid amount in the invoice; and generating a payment line where a sub-payment amount is allocated to each invoice line and the sub-payment amount is a portion of the payment amount of the associated payment instruction. Processing the distributed payment lines includes: generating a financial transaction record corresponding to each payment line where each financial transaction record includes a unique financial transaction identifier, each field of the associated payment line, and a status of the financial transaction associated with the validation of the financial transaction; freezing each valid financial transaction; and transmitting each frozen financial transaction to the billing system database for storage.

In one aspect of the above embodiment, the driver information handling system is further configured to execute instructions for identifying the payment lines for distribution among the partitions where the instructions are configured for calculating an available number of partitions using a parameter specifying a maximum number of lines per partition, and assigning each payment line among the available number of partitions. In another aspect of the above embodiment, the payment executor module assigns each payment instruction having a common priority to a data partition for processing by executing further instructions for determining a number of payment instructions associated with the common priority, and evenly dividing the number of payment instructions associated with the common priority among a number of data partitions available on the executor node.

In another aspect of the above embodiment, pre-processing the set of payment instructions further includes validating a payment instruction assigned to a partition against a record in the billing system database, and marking a result of the validating in the payment instruction.

In one aspect of the above embodiment, the system further includes the payment executor module being further configured to execute instructions for post-processing a set of payment status records, and the one or more processors associated with the data partitions further configured to execute instructions for postprocessing the payment status record. Each payment status record is generated from the frozen financial transaction records by the driver node and each payment status record is distributed among the partitions in accord with payment status distribution instructions received from the driver node. Each of the one or more processors is configured to perform the post-processing by executing further instructions for updating a final status of each payment status record, logging an error in a payment status record to the billing system database, and performing recovery operations from the error in the payment status record.

In another aspect of the above embodiment, processing the distributed payment lines further includes invoking one or more billing system operations, and transmitting the financial transaction and billing system invocation commands to the billing system for execution by the billing system. In yet another aspect of the above embodiment, instructions for processing the distributed payment lines further include inserting a status identifier in the financial transaction record indicating that a valid transaction is frozen subsequent to the freezing the valid financial transaction record, and skipping freezing an invalid financial transaction record and inserting a status identifier in the financial transaction record indicating that the invalid financial transaction record is not frozen. In yet another aspect, pre-processing the set of payment instructions by the executor node further includes transmitting the partitioned payment instructions to the driver node for storage is a first checkpoint.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIGS. 1 and 2 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of information handling system 100 are circuitry located on a single integrated circuit or within a same device. Alternatively, information handling system 100 may include any number of separate integrated circuits or separate devices interconnected with each other. For example, memory 112 may be located on a same integrated circuit as CPUs 102 or on a separate integrated circuit or located within another peripheral or slave discretely separate from other elements of information handling system 100. Subsystems 108 and I/O circuitry 106 may also be located on separate integrated circuits or devices. Also for example, information handling system 100 or portions thereof may be soft or code representations of physical circuitry or of logical representations convertible into physical circuitry. As such, system 100 may be embodied in a hardware description language of any appropriate type.

Furthermore, those skilled in the art will recognize that boundaries between the functionality of the above-described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of information handling system 100, for example, from computer readable media such as memory 112 or other media on other service provider systems 142. Such computer readable media may be permanently, removably or remotely coupled to an information handling system 100. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, information handling system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory, and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. For example, a varying number of processor cores on each worker node 210 can be available and a varying number of worker nodes. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A computer-implemented method for executing high-speed payment processing in a cluster of information handling systems, the method comprising:
   a driver information handling system of the cluster of information handling systems, comprising a payment driver in communication with multiple executor nodes, wherein when the payment driver assigns payment instructions, such payment instructions can be check-pointed and stored in persistent storage;
   pre-processing a set of payment instructions by an executor node of the cluster of information handling systems, wherein
   the executor node runs multiple threads and tasks, each task operating on a specific data partition,
   the executor node is configured to process data stored in one or more data partitions,
   each data partition is associated with a specific task of the executor node, wherein the specific task is assigned by a driver and the executor node executes code assigned by the driver and reports state of computation to the driver, and a corresponding processor of the executor node configured to process the data stored in the data partition,
   each payment instruction comprises a payment identifier, customer identifier, an invoice identifier, and a payment amount,
   said pre-processing comprises
      associating each payment instruction with a corresponding invoice identifier,
      for each payment instruction having a same customer identifier and invoice identifier, prioritizing the payment instruction in order of receipt from a customer associated with the customer identifier,
      assigning each payment instruction having a common priority to a data partition for processing in order of priority,
      for each payment instruction, by the processor corresponding to the associated data partition,
         locating an invoice associated with the invoice identifier, wherein the invoice is stored in a billing system database communicatively coupled to the executor node,
         generating an invoice line from the invoice for each unpaid amount in the invoice, generating a payment line, wherein a sub-payment amount is allocated to each invoice line and the sub-payment amount is a portion of the payment amount of the associated payment instruction; and
   processing the set of payment lines by the executor node, wherein
   the payment lines are identified for distribution among the partitions by a driver node of the cluster of information handling systems,
   each payment line comprises a unique payment line identifier, the customer identifier, the payment identifier, the payment amount, an invoice line identifier, and a payment line amount,
   processing comprises
      generating a financial transaction record corresponding to each payment line, wherein each financial transaction comprises a unique financial transaction identifier, each field of the associated payment line, and a status of the financial transaction associated with a validation of the financial transaction,
      freezing each valid financial transaction,
      transmitting each frozen financial transaction to the billing system database for storage.

2. The method of claim 1, wherein said assigning each payment instruction having a common priority to a data partition for processing further comprises:
   determining a number of payment instructions associated with the common priority; and
   evenly dividing the number of payment instructions associated with the common priority among a number of data partitions available on the executor node.

3. The method of claim 1 wherein allocating the sub-payment amount to each invoice line further comprises:
   applying the payment amount to each invoice line up to the unpaid amount in the invoice line; and
   generating an excess payment line comprising an excess payment amount when the payment amount exceeds a total unpaid amount from all invoice lines.

4. The method of claim 1 wherein said pre-processing further comprises:
   identifying an action for processing from each payment instruction, wherein an action can be one of create, cancel, and cancel and re-create; and
   marking the action for processing in the corresponding payment line.

5. The method of claim 1 wherein said pre-processing further comprises:
   validating a payment instruction assigned to a partition against a record in the billing system database; and
   marking a result of said validating in the payment instruction.

6. The method of claim 1 wherein said pre-processing further comprises:
   transmitting the partitioned payment instructions to the driver node for storage as a first checkpoint.

7. The method of claim 1, wherein the unique payment line identifier comprises:
   a service identifier associated with the invoice line;
   a partition identifier; and
   a padded random number.

8. The method of claim 1, wherein the unique financial transaction identifier comprises:
   a portion generated using the unique payment line identifier;
   a partition identifier; and
   a padded random number.

21

9. The method of claim 1 wherein said processing further comprises:

invoking one or more billing system operations; and transmitting the financial transaction and billing system invocation commands to a billing system node.

10. The method of claim 1 wherein said processing further comprises:

inserting a status identifier in the financial transaction record indicating that a valid transaction is frozen subsequent to said freezing the valid financial transaction record; and skipping freezing an invalid financial transaction record and inserting a status identifier in the financial transaction record indicating that the invalid financial transaction record is not frozen.

11. The method of claim 1 wherein the driver node identifies the payment lines for distribution among the partitions by a method comprising:

calculating an available number of partitions using a parameter specifying a maximum number of lines per partition; and assigning each payment line among the available number of partitions.

12. The method of claim 1 further comprising:

post-processing a set of payment status records, wherein each payment status record is generated from the frozen financial transaction records by the driver node and each payment status record is distributed among the partitions in accord with payment status distribution instructions received from the driver node, and said post-processing comprises a final status of each payment status record, logging an error in the payment status record to the billing system database, and performing recovery operations from the error in the payment status record.

13. A system for executing high-speed payment processing, the system comprising:

a cluster of information handling systems, the cluster comprising a driver information handling system configured to execute a payment driver module, comprising a payment driver in communication with multiple executor execution information handling systems, wherein when the payment driver assigns payment instructions, such payment instructions can be checkpointed and stored in persistent storage; and or more executor information handling systems, coupled to the driver information handling system, wherein each executor information handling system comprises one or more data partitions configured to store data, a payment executor module configured to execute instructions for receiving a set of payment instructions wherein each payment instruction comprises a payment identifier, customer identifier, an invoice identifier, and a payment amount, pre-processing the set of payment instructions, wherein said pre-processing the set of payment instructions comprises associating each payment instruction with a corresponding invoice identifier, for each payment instruction having a same customer identifier and invoice identifier, prioritizing the payment instruction in order of receipt from a customer associated with the customer identifier, and

22 assigning each payment instruction having a common priority to a data partition for processing in order of priority, wherein the data partition is associated with a specific task of an executor node, wherein the specific task is assigned by a driver and the executor node executes code assigned by the driver and reports state of computation to the driver, and distributing to data partitions, after said pre-processing the set of payment instructions, a set of received payment lines generated from the pre-processed payment instructions, and one or more processors communicatively coupled to the payment executor module, wherein the payment executor module runs multiple threads and tasks, each task operating on a specific data partition, each processor associated with a corresponding data partition of the one or more data partitions, and each data partition is associated with a specific task of the payment executor module, and each processor configured to execute instructions for pre-processing the assigned payment instructions in the associated data partition, said pre-processing the assigned payment instructions comprises locating an invoice associated with the invoice identifier, wherein the invoice is stored in a billing system database communicatively coupled to the executor node, generating an invoice line from the invoice for each unpaid amount in the invoice, generating a payment line wherein a sub-payment amount is allocated to each invoice line, and the sub-payment amount is a portion of the payment amount of the associated payment instruction, and processing the distributed payment lines in the associated data partition, said processing the distributed payment lines comprises generating a financial transaction record corresponding to each payment line, wherein each financial transaction record comprises a unique financial transaction identifier, each field of the associated payment line, and a status of the financial transaction associated with a validation of the financial transaction, freezing each valid financial transaction, and transmitting each frozen financial transaction to a billing system database for storage; and a billing system, communicatively coupled to the cluster of information handling systems, comprising the billing system database.

14. The system of claim 13 wherein the driver information handling system is further configured to execute instructions for identifying the payment lines for distribution among the partitions, wherein the instructions are configured for calculating an available number of partitions using a parameter specifying a maximum number of lines per partition; and assigning each payment line among the available number of partitions.

15. The system of claim 13, wherein the payment executor module assigns each payment instruction having a common priority to a data partition for processing by executing further instructions for determining a number of payment instructions associated with the common priority; and evenly dividing the number of payment instructions associated with the common priority among a number of data partitions available on the executor node.

16. The system of claim 13 wherein said pre-processing the set of payment instructions further comprises:

validating a payment instruction assigned to a partition against a record in the billing system database; and marking a result of the said validating in the payment instruction.

17. The system of claim 13 further comprising:

the payment executor module further configured to execute instructions for post-processing a set of payment status records, wherein each payment status record is generated from the frozen financial transaction records by the driver node and each payment status record is distributed among the partitions in accord with payment status distribution instructions received from the driver node; and the one or more processors associated with the data partitions are further configured to execute instructions for post-processing the payment status record stored in the associated partition by executing further instructions for updating a final status of each payment status record, logging an error in a payment status record to the billing system database, and performing recovery operations from the error in the payment status record.

18. The system of claim 13 wherein said processing the distributed payment lines further comprises:

invoking one or more billing system operations; and transmitting the financial transaction and billing system invocation commands to the billing system for execution by the billing system.

19. The system of claim 13 wherein said instructions for processing the distributed payment lines further comprises:

inserting a status identifier in the financial transaction record indicating that a valid transaction is frozen subsequent to said freezing the valid financial transaction record; and skipping freezing an invalid financial transaction record and inserting a status identifier in the financial transaction record indicating that the invalid financial transaction record is not frozen.

* * * * *